Figure 1:
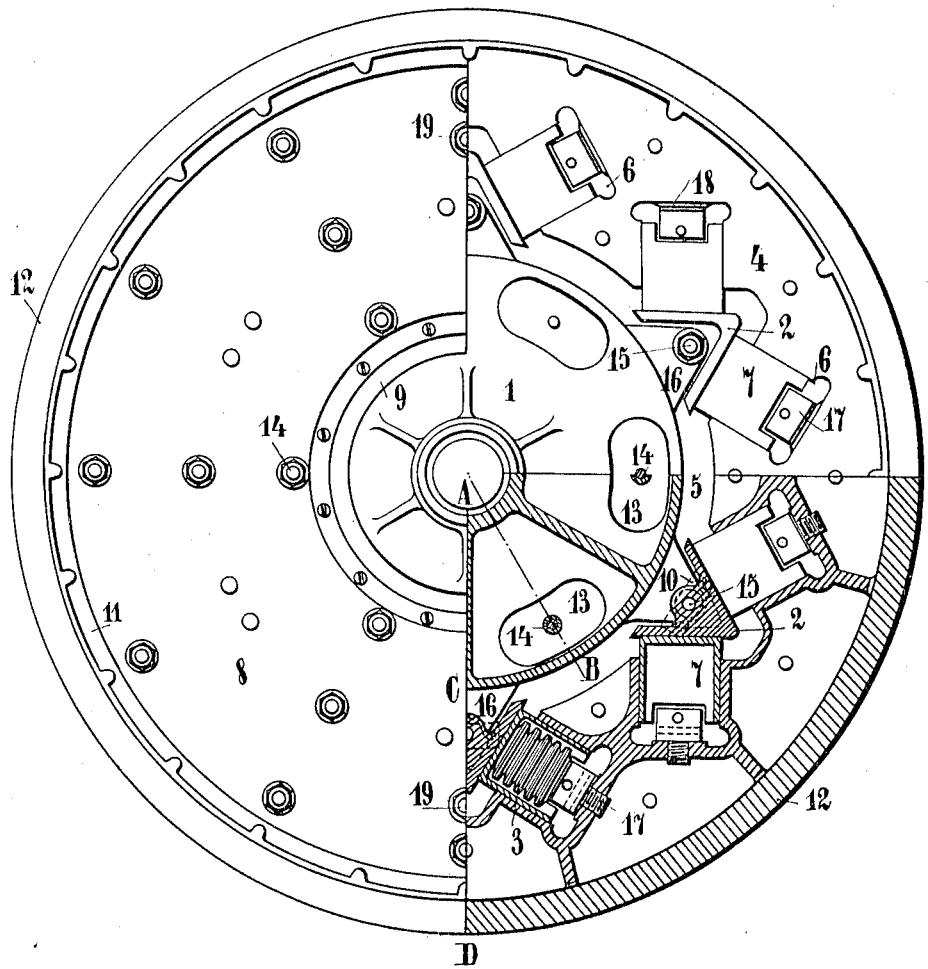

G. CAUVRY & L. SALEL.
RESILIENT WHEEL.
APPLICATION FILED FEB. 20, 1912.

1,090,199.

Patented Mar. 17, 1914.
2 SHEETS—SHEET 1.

WITNESSES:
E. H. McGee.
N. H. Brereton.

INVENTOR
Gaston Cauvry and Lucien Salel
BY
ATTORNEY

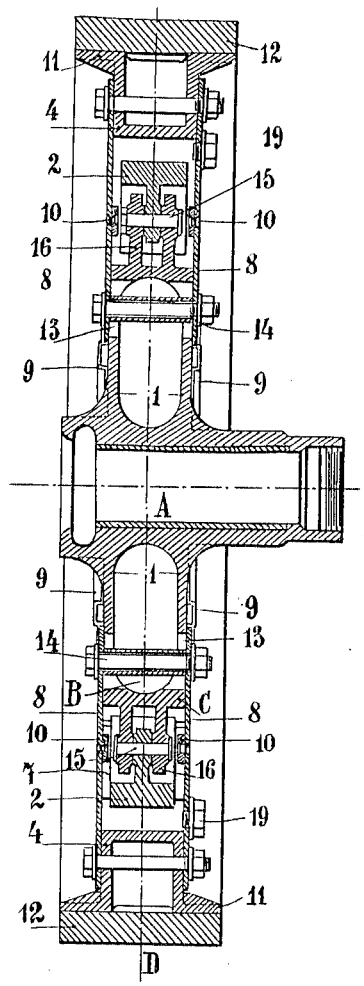

UNITED STATES PATENT OFFICE.

GASTON CAUVRY AND LUCIEN SALEL, OF MARSEILLE, FRANCE.

RESILIENT WHEEL.

1,090,199.	Specification of Letters Patent.	Patented Mar. 17, 1914.

Application filed February 20, 1912. Serial No. 678,863.

*To all whom it may concern:*

Be it known that we, GASTON CAUVRY and LUCIEN SALEL, citizens of the Republic of France, and residents of Marseille, France, have invented new and useful Improvements in Resilient Wheels, which improvements are fully set forth in the following specification.

The present invention has reference to improvements in resilient wheels, and especially of that type of wheel which is equipped with driving teeth that are designed to act on shock-absorbing devices, the improvements in question relating primarily to the construction and mounting of the aforesaid teeth and shock-absorbing devices and being of such a character as to result in deadening the shocks due to surface irregularities in the road, and in reducing the effects of these shocks in the part of the motor car or other vehicle supported by the axle.

An embodiment of the invention is illustrated in the accompanying drawing, whereof:—

Figure 1 is a view of the improved wheel partly in side elevation and partly in longitudinal section; and Fig. 2 is a central transverse section.

As shown in said drawing, the wheel is constituted of two distinct parts: one fixed and secured to the hub, and the other movable relatively thereto. The first-named part consists of a circular disk 1 which is perpendicular to the axis of the wheel, is made of wood, metal or any other suitable material, and is provided at its periphery with lugs 16, the latter, in the construction illustrated, being substantially V-shaped. These lugs carry cross-pins 15, upon which, in turn, are pivotally mounted the hollow, wedge- or V-shaped teeth 2, said teeth serving to drive the movable part of the wheel and to transmit to it the load of the fixed part by means of the hereinafter-described shock-absorbing devices. The number and size of the teeth will, of course, vary in accordance with the dimensions of the wheel and the strains to which it is subjected.

The complemental, or movable part of the wheel consists of a circular disk 4, whose central portion 5 is recessed, so as to receive the peripheral teeth of the fixed disk 1. In the thick central portion of the disk 4 is provided a series of pairs of recesses 6, the number of such pairs corresponding to the number of driving teeth, and these recesses, which have an angular arrangement relatively to each other, are designed to receive the aforesaid shock-absorbing devices. Said devices, as will be understood, are also arranged in pairs, one pair acting upon each tooth at opposite sides thereof, and they are constituted of sliding caps 7 loosely fitting in the recesses 6 and containing suitable elastic elements 3, here shown as formed of flexible washers of the so-called Belleville type, though other spring cushioning elements might obviously be used with equal facility.

On the two faces of the disk 4 are secured cover plates 8 of metal or other material, between which cover plates the hub structure slides. To each of these cover plates a channel ring 9 is secured, such ring being adapted to contain packing, for the purpose of preventing escape of lubricant. The inner faces of the cover plates 8 are provided with stops 10, which act to prevent the caps 7 from moving entirely out of their recesses 6, said stops having any size and shape considered expedient, and one of said cover plates may be provided with a lubricating plug 19, or a series of such plugs.

The tire 12 is carried by a rim 11 which is provided on the periphery of disk 4, while the disk 1 is provided with recesses 13 through which the stay bolts 14 pass. Said bolts serve to retain the cover plates 8 the proper distance apart, and the recesses 13 are of suitable shape and of sufficient size to permit the necessary play of the bolts.

In order to regulate the tension of the shock-absorbing elements 3, there may be arranged in the inner walls of the recesses 6 a series of set screws 17 which may be adjusted in the obvious manner.

We claim—

1. A cushion wheel comprising two parts, one of which carries the hub and has on its circumference radially arranged pivotally-mounted driving teeth of wedge-shaped outline and the other of which is concentric to the first part and is shiftable relatively thereto in the plane thereof, the second part having recesses which extend at angles to one another and confront the faces of the driving teeth, caps slidable in the recesses for engagement with the driving teeth, and shock-absorbing devices arranged in the recesses and engaging the caps.

2. A cushion wheel comprising a relatively fixed hub section and a relatively movable rim section, a series of pivotally-mounted driving members of wedge-shaped outline borne by the hub section, and a series of pairs of shock-absorbing devices borne by the rim section and confronting the faces of the adjacent driving members.

In testimony whereof we have signed this specification in the presence of two subscribing witnesses.

GASTON CAUVRY.
LUCIEN SALEL.

Witnesses:
JUSTINIEN,
PAUL H. CRAM.

Copies of this patent may be obtained for five cents each, by addressing the "Commissioner of Patents, Washington, D. C."